(12) United States Patent
Oesterling et al.

(10) Patent No.: US 7,024,308 B2
(45) Date of Patent: Apr. 4, 2006

(54) TELEMATIC METHOD FOR REAL-TIME ROUTING TO STOLEN VEHICLES

(75) Inventors: Christopher L. Oesterling, Troy, MI (US); Anthony J Sumcad, Southfield, MI (US); Jeffrey M. Stefan, Clawson, MI (US); Ernest B. Rennells, Sterling Heights, MI (US)

(73) Assignee: General Motors Corporation, Detroit, MI (US)

( * ) Notice: Subject to any disclaimer, the term of this patent is extended or adjusted under 35 U.S.C. 154(b) by 37 days.

(21) Appl. No.: 10/740,878

(22) Filed: Dec. 19, 2003

(65) Prior Publication Data

US 2005/0137797 A1    Jun. 23, 2005

(51) Int. Cl.
*G01S 13/78* (2006.01)
*G08B 25/00* (2006.01)

(52) U.S. Cl. .................. 701/213; 701/209; 342/357.07

(58) Field of Classification Search ................. 701/213, 701/209, 214, 300; 342/357.07, 357.09; 340/426.15, 426.19, 438; 455/456.5; 702/188
See application file for complete search history.

(56) References Cited

U.S. PATENT DOCUMENTS

| 4,908,629 | A | * | 3/1990 | Apsell et al. ................ 342/457 |
| 5,895,436 | A | * | 4/1999 | Savoie et al. ................ 701/214 |
| 6,282,491 | B1 | * | 8/2001 | Bochmann et al. ......... 701/209 |
| 6,642,844 | B1 | * | 11/2003 | Montague ..................... 340/524 |
| 6,678,621 | B1 | * | 1/2004 | Wiener et al. ................ 702/75 |
| 6,831,597 | B1 | * | 12/2004 | Sasaki et al. .......... 342/357.07 |

* cited by examiner

*Primary Examiner*—Thomas G. Black
*Assistant Examiner*—Dalena Tran
(74) *Attorney, Agent, or Firm*—Anthony Luke Simon

(57) ABSTRACT

A telematic system includes a first telematic unit incorporated within a stolen vehicle, a call center, and a second telematic unit incorporated with a police vehicle. The telematic system implements a method for real-time routing to the stolen vehicle. The method cyclically involves a determination of the GPS coordinates of the stolen vehicle and the police vehicle by the respective telematic unit, a calculation of a complete route from the police vehicle to the stolen vehicle, and a calculation of a partial route extending from the police vehicle to the stolen vehicle. The GPS coordinates of the stolen vehicle can be pushed to the police vehicle whereby the second telematic unit obtains the route calculations. Alternatively, the GPS coordinates of both the stolen vehicle and the police vehicle can be pushed to the call center whereby the call center performs the route calculations.

12 Claims, 5 Drawing Sheets

TELEMATIC METHOD FOR REAL-TIME ROUTING TO STOLEN VEHICLES

FIELD OF THE INVENTION

In general, the invention relates to telematic methods for locating and aiding in the pursuit of stolen vehicles. More specifically, the invention relates to a telematic method incorporating telematic units in a police vehicle and a stolen vehicle to facilitate a calculation of a best route from the police vehicle to the stolen vehicle.

BACKGROUND OF THE INVENTION

A mobile application service provider provides information and services to the vehicles of subscribers from a data center through a vehicle installed wireless telecommunication apparatus. Examples of types of services provided are emergency response assistance, roadside service assistance, location-based services such as turn-by-turn directions, phone number directory lookup assistance, and points of interest lookup.

Currently, locating stolen vehicles requires manual vehicle occupant intervention or a third-party operator announcing the location of the stolen vehicle. Thus, there is a significant need for employing a mobile application service provider in locating and aiding in the pursuit of stolen vehicles.

SUMMARY OF THE INVENTION

The present invention is a method for real-time routing of a police vehicle to a stolen vehicle implemented by a system employing a first telematic unit incorporated within the stolen vehicle, a call center incorporated with a call center and a second telematic unit incorporated with the police vehicle One form of the method involves (1) an operation of the first telematic unit to determine a first GPS coordinates of the stolen vehicle and to communicate the first GPS coordinates of the stolen vehicle to the call center, (2) an operation of the call center to communicate the first GPS coordinates of the stolen vehicle to the second telematic unit, (3) an operation of the second telematic unit to determine a second GPS coordinates of the police vehicle, (4) an operation of the second telematic unit to calculate a first complete route from the second GPS coordinates to the first GPS coordinates, and (5) an operation of the second telematic unit to calculate a first partial route extending from the second GPS coordinates along the first complete route.

A second form of the method involves (1) an operation of the first telematic unit to determine a first GPS coordinates of the stolen vehicle and to communicate the first GPS coordinates of the stolen vehicle to the call center, (2) an operation of the second telematic unit to determine a second GPS coordinates of the police vehicle and to communicate the second GPS coordinates of the police vehicle to the call center, (3) an operation of the call center to calculate a first complete route from the second GPS coordinates to the first GPS coordinates, (4) an operation of the call center to calculate a first partial route extending from the second GPS coordinates along the first complete route, and (5) an operation of the call center to communicate the first partial route to the second telematic unit.

The foregoing forms as well as other forms and features and advantages of the present invention will become further apparent from the following detailed description of the presently preferred embodiment, read in conjunction with the accompanying drawings. The detailed description and drawings are merely illustrative of the invention rather than limiting, the scope of the present invention being defined by the appended claims and equivalents thereof.

DETAILED DESCRIPTION OF THE PRESENTLY PREFERRED EMBODIMENTS

Figure 1:
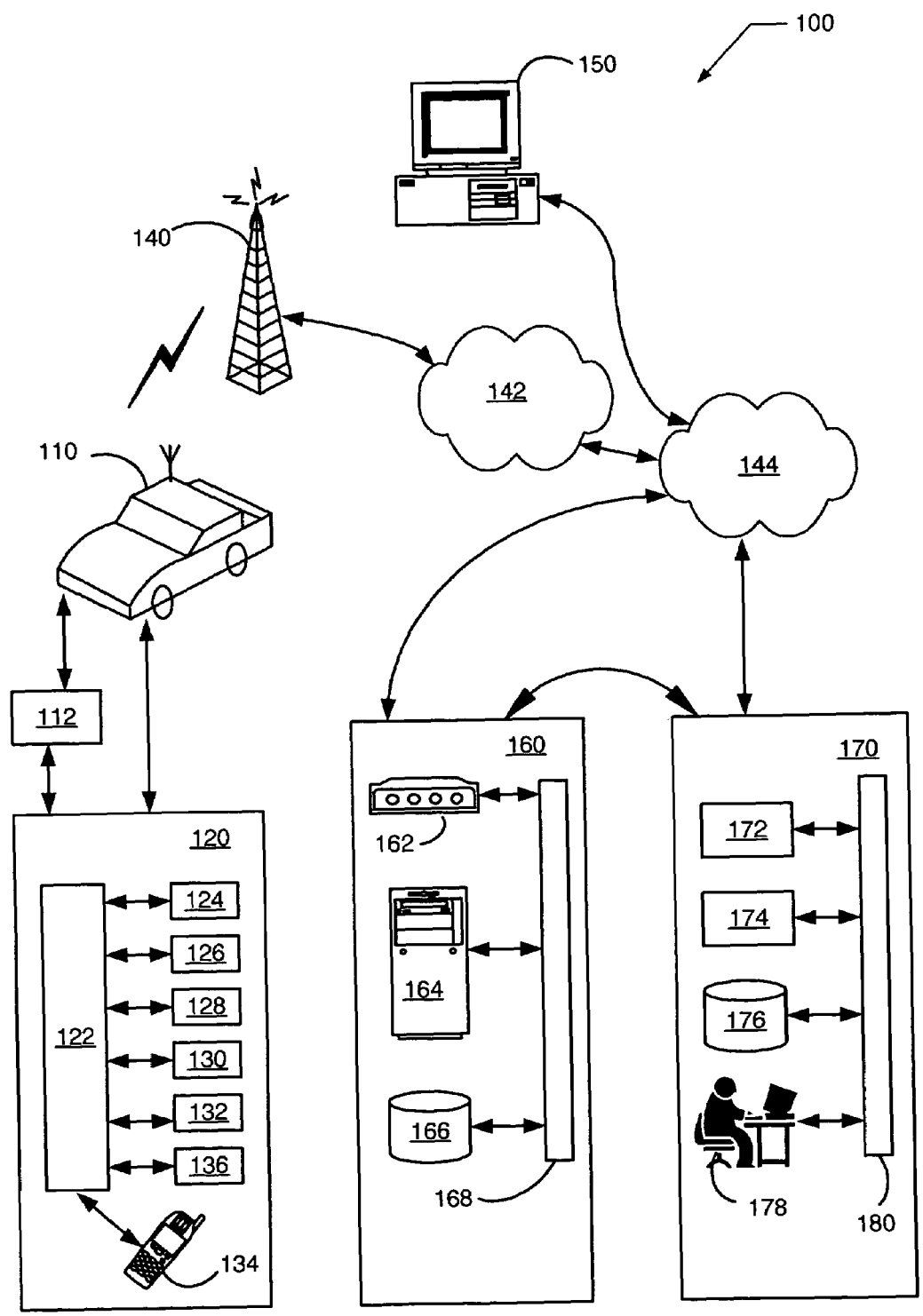
FIG. 1 illustrates one embodiment of a system for communicating from a telematics unit to a call center in accordance with the present invention.

FIG. 1 is an illustrative operating environment for a vehicle in an embodiment of the present invention. FIG. 1 shows a vehicle communication system 100. Vehicle communication system 100 includes at least one vehicle 110 including vehicle communication bus 112 and telematics unit 120, one or more wireless carrier systems 140, one or more communication networks 142, one or more land networks 144, one or more client, personal or user computers 150, one or more web-hosting portals 160, and one or more call centers 170. In one embodiment, vehicle 110 is implemented as a mobile vehicle equipped with suitable hardware and software for transmitting and receiving voice and data communications.

In one embodiment, telematics unit 120 is a vehicle communications unit that includes a digital signal processor (DSP) 122 connected to a wireless modem 124, a global positioning system (GPS) unit 126, an in-vehicle memory 128, such as, for example, a non-volatile flash memory, a microphone 130, one or more speakers 132, an embedded or in-vehicle mobile phone 134, and a wireless access point node 136. DSP 122 is also referred to as a micro-controller, controller, ASIC, host processor, or vehicle communications processor. GPS unit 126 provides longitude and latitude coordinates of the vehicle, as well as a time stamp. In one embodiment, GPS unit 126 provides a heading and speed data directly, or provides data for use in calculating vehicle 110 heading and speed. In-vehicle mobile telephone system 134 is a cellular-type phone, such as, for example an analog, digital, dual-mode, dual-band, multi-mode or multi-band cellular phone. In another example, the mobile telephone system is an analog mobile telephone system operating over a prescribed band nominally at 800 MHz. In another example, the mobile telephone system is a digital mobile telephone system operating over a prescribed band nominally at 800 MHz, 900 MHz, 1900 MHz, or any suitable band capable of carrying digital cellular communications.

DSP 122 executes various computer programs and communication control and protocol algorithms that control communication, programming and operational modes of electronic and mechanical systems within vehicle 110. In one embodiment, DSP 122 is an embedded system controller. In another embodiment, DSP 122 controls communications between telematics unit 120, wireless carrier system 140, and call center 170. In another embodiment, DSP 122 controls communications between the wireless access point node 134 and nodes of a mobile ad hoc network. In one embodiment, a speech-recognition application is installed in DSP 122 to translate human voice input through microphone 130 into digital signals. DSP 122 generates and accepts digital signals transmitted between telematics unit 120 and a vehicle communication bus 112 that is connected to various electronic modules in the vehicle 110. In one embodiment, the digital signals activate a programming mode and operation modes, as well as provide for data transfers.

Vehicle 110, via a vehicle communication bus 112, sends signals to various units of equipment and systems within the vehicle 110 to perform various functions such as monitoring the operational state of vehicle systems, collecting and storing data from the vehicle systems, providing instructions, data and programs to various vehicle systems and calling from telematics unit 120. In facilitating interactions among the various communication and electronic modules, vehicle communication bus 112 utilizes bus interfaces such as controller-area network (CAN), J1850, International Organization for Standardization (ISO) Standard 91205, ISO Standard 11898 for high-speed applications, and ISO Standard 11519 for lower speed applications.

Vehicle 110, via telematics unit 120, sends and receives radio transmissions from wireless carrier system 140. Wireless carrier system 140 is implemented as any suitable system for transmitting a signal from mobile vehicle 110 to communication network 142. Wireless carrier system 140 incorporates any type of telecommunications in which electromagnetic waves carry signal over part of or the entire communication path. In one embodiment, wireless carrier system 140 transmits analog audio, digital audio (including, but not limited to, CDMA, TDMA, FDMA, GSM). In an example, wireless carrier system 140 transmits analog audio such as those sent from AM and FM radio stations and transmitters, or digital audio signals in the S band (approved for use in the U.S.) and L band (used in Europe and Canada). In one embodiment, wireless carrier system 140 is a satellite broadcast system broadcasting over a spectrum in the "S" band (2.3 GHz) that has been allocated by the U.S. Federal Communications Commission (FCC) for nationwide broadcasting of satellite-based Digital Audio Radio Service (DARS).

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to mobile vehicle 110 and land network 144. In one example, wireless carrier system 140 includes a short message service, modeled after established protocols such as IS-637 SMS standards, IS-136 air interface standards for SMS, and GSM 03.204 and 09.02 standards. Similar to paging, an SMS communication could be broadcast to a number of regional recipients. In another example, the carrier system 140 uses services in accordance with other standards, such as, for example, IEEE 802.11 compliant wireless systems and Bluetooth compliant wireless systems.

Land network 144 is, in one embodiment, a public-switched telephone network (PSTN). In one embodiment, land network 144 is implemented as an Internet protocol (IP) network. In other embodiments, land network 144 is implemented as a wired network, an optical network, a fiber network, another wireless network, or any combination thereof. Land network 144 is connected to one or more landline telephones. Land network 144 connects communication network 142 to user computer 150, web-hosting portal 160, and call center 170. Communication network 142 and land network 144 connects wireless carrier system 140 to web-hosting portal 160 and call center 170.

Client, personal or user computer 150 includes a computer usable medium to execute Internet browser and Internet-access computer programs for sending and receiving data over land network 144 and optionally, wired or wireless communication networks 142 to web-hosting portal 160 and vehicle 110. Personal or user computer 150 sends data requests to web-hosting portal through a web-page interface using communication standards such as hypertext transport protocol (HTTP), and transport-control protocol Internet protocol (TCP/IP). In one embodiment, the data includes directives to change certain programming and operational modes of electronic and mechanical systems within vehicle 110. In another embodiment, the data includes directives to send certain data such as operational modes of electronic and mechanical systems within vehicle 110. In operation, a user, such as, for example, a vehicle designer or manufacturing engineer, utilizes user computer 150 to access real-time data from vehicle 110 that is cached or stored in web-hosting portal 160. Data from client-side software is transmitted to server-side software of web-hosting portal 160. In one embodiment, data is stored at web-hosting portal 160. In another embodiment, client computer 150 includes a database (not shown) for storing received data. In yet another embodiment, a private Local Area Network (LAN) is implemented for client computer 150 and Web hosting portal 160, such that web hosting portal is operated as a Virtual Private Network (VPN).

Web-hosting portal 160 includes one or more data modems 162, one or more web servers 164, one or more databases 166, and at least one network 168. In one embodiment, web-hosting portal 160 is connected directly by wire to call center 170, or connected by phone lines to land network 144, which is connected to call center 170. In another embodiment, web-hosting portal 160 is connected to call center 170 without a direct wire connection, but with a connection allowing communication between the call center 170 and the web-hosting portal 160. Web-hosting portal 160 is connected to land network 144 by one or more data modems 162. Land network 144 sends digital data to and from modem 162; data that is subsequently transferred to web server 164. In one implementation, modem 162 resides inside web server 164. Land network 144 transmits data communications between web-hosting portal 160 and call center 170.

Web server 164 receives various data requests or instructions from user computer 150 via land network 144. In alternative embodiments, user computer 150 includes a wireless modem to send data to web-hosting portal 160 through a wireless communication network 142 and a land network 144. Data is received by modem 162 and sent to one or more web servers 164. In one embodiment, web server 164 is implemented as any suitable hardware and software capable of providing web services to transmit and receive data from user computer 150 to telematics unit 120 in vehicle 110. Web server 164 sends to or receives data transmissions from one or more databases 166 via network 168. Web server 164 includes computer applications and files for managing data.

In one embodiment, one or more web servers 164 are networked via network 168 to distribute data among its network components such as database 166. In an example, database 166 is a part of or a separate computer from web server 164. In one embodiment, web-server 164 sends data transmissions with data to call center 170 via modem 162, and through land network 144.

Call center 170 is a location where many calls are received and serviced at the same time, or where many calls are sent at the same time. In one embodiment, the call center is a telematics call center, facilitating communications to and from telematics unit 120 in vehicle 110. In an example, the call center is a voice call center, providing verbal communications between an advisor in the call center and a subscriber in a mobile vehicle. In another example, the call center contains each of these functions. In other embodiments, call center 170 and web-hosting portal 160 are located in the same or different facilities.

Call center 170 contains one or more voice and data switches 172, one or more communication services managers 174, one or more communication services databases 176, one or more communication services advisors 178, and one or more networks 180.

Switch 172 of call center 170 connects to land network 144. Switch 172 transmits voice or data transmissions from call center 170, and receives voice or data transmissions from telematics unit 120 in mobile vehicle 110 through at least one of wireless carrier system 140 and wireless access point node 136, communication network 142, and land network 144. Switch 172 receives data transmissions from, and sends data transmissions to, one or more web-hosting portals 160. Switch 172 receives data transmissions from, or sends data transmissions to, one or more communication services managers 174 via one or more networks 180.

Communication services manager 174 is any suitable hardware and software capable of providing communication services to telematics unit 120 in mobile vehicle 110. Communication services manager 174 sends to or receives data transmissions from one or more communication services databases 176 via networks 180. Communication services manager 174 sends to or receives data transmissions from one or more communication services advisors 178 via networks 180. Communication services advisor 178 via networks 180 accesses communication services database 176 to send or receive data transmissions. Communication services advisor 178 receives from or sends to switch 172 voice or data transmissions.

Communication services manager 174 facilitates one or more services, such as, but not limited to, enrollment services, navigation assistance, directory assistance, roadside assistance, business or residential assistance, information services assistance, emergency assistance, and communications assistance and vehicle data management services. Communication services manager 174 receives service requests for data from a user via user computer 150, web-hosting portal 160, and land network 144. Communication services manager 174 transmits and receives operational status, instructions and other types of vehicle data to telematics unit 120 in vehicle 110 through wireless carrier system 140, communication network 142, land network 144, wireless access point node 136, voice and data switch 172, and networks 180. Communication services manager 174 stores or retrieves vehicle data and information from communication services database 176. Communication services manager 174 provides requested information to communication services advisor 178.

In one embodiment, communication services advisor 178 is a real advisor. In another embodiment, communication services advisor 178 is implemented as a virtual advisor. In an example, a real advisor is a human being at service provider service center in verbal communication with service subscriber in mobile vehicle 110 via telematics unit 120. In another example, a virtual advisor is implemented as a synthesized voice interface responding to requests from telematics unit 120 in mobile vehicle 110.

Communication services advisor 178 provides services to telematics unit 120 in mobile vehicle 110. Services provided by communication services advisor 178 include enrollment services, navigation assistance, real-time traffic advisories, directory assistance, roadside assistance, business or residential assistance, information services assistance, emergency assistance, and communications assistance. Communication services advisor 178 communicates with telematics unit 120 in mobile vehicle 110 through wireless carrier system 140, communication network 142, and land network 144 using voice transmissions, or through communication services manager 174 and switch 172 using data transmissions. Switch 172 selects between voice transmissions and data transmissions.

Vehicle 110 initiates service requests to call center 170 by sending a voice or digital-signal command to telematics unit 120 which in turn, sends an instructional signal or a voice call through wireless modem 124, wireless carrier system 140, communication network 142, and land network 144 to call center 170. In another embodiment, the mobile vehicle 110 receives a request from call center 170 to send various vehicle data from mobile vehicle 110 through telematics unit 120 through wireless modem 124, wireless access point node 136, wireless carrier system 140, communication network 142, and land network 144 to call center 170.

Figure 2:
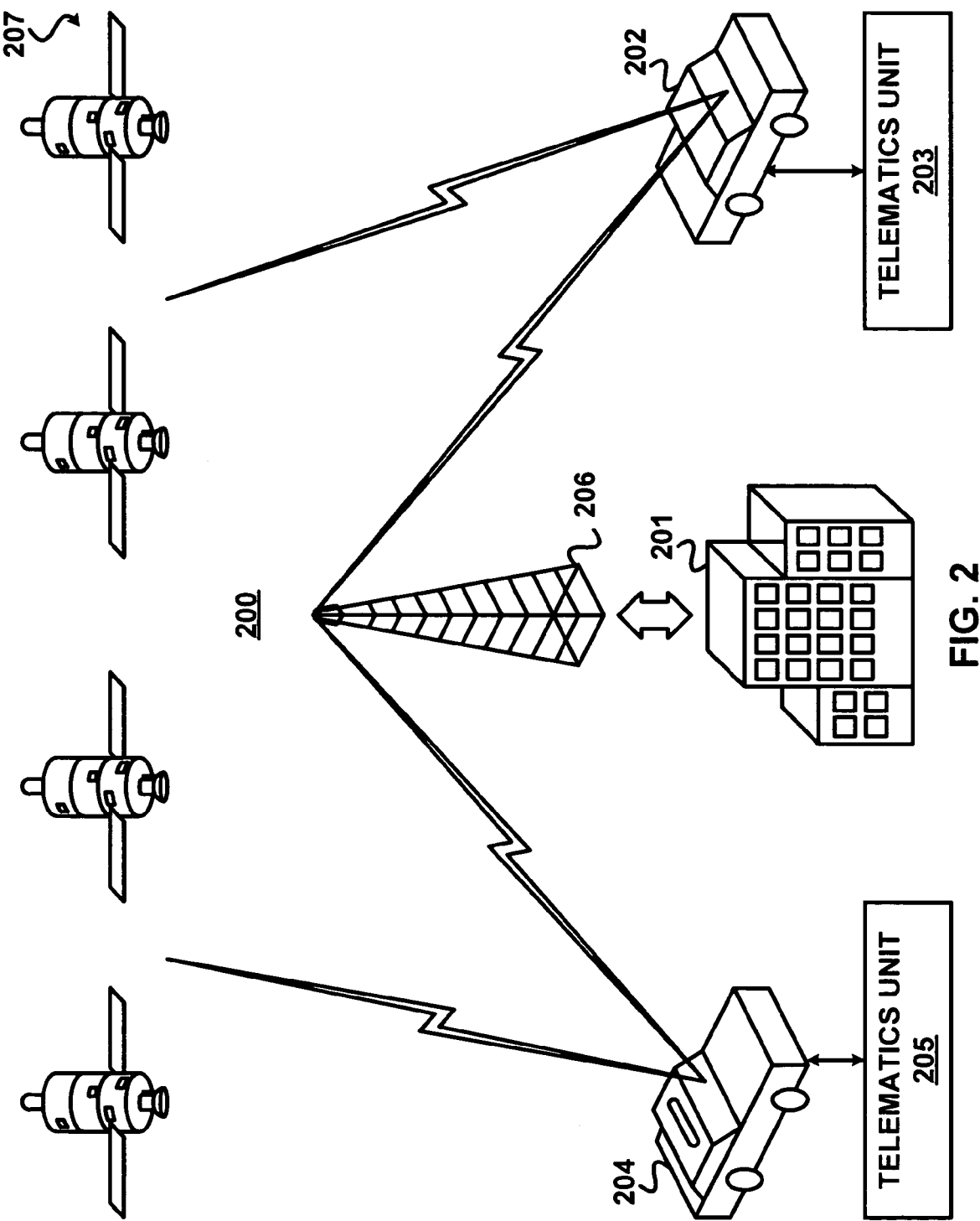
FIG. 2 illustrates one embodiment of a system for real-time routing of a police vehicle to a stolen vehicle in accordance with the present invention.

FIG. 2 illustrates a system 200 employing a call center 201, a telematic unit 203 incorporated within a stolen vehicle 202, a telematic unit 205 incorporated within a police vehicle 204, a wireless carrier system 206, and conventional GPS satellites 207.

In one embodiment, telematic unit 205 includes a navigation computer to calculate navigations paths. In another embodiment, telematic unit 205 is in communication with a navigation computer and receives navigation information from the navigational computer.

Figure 3:
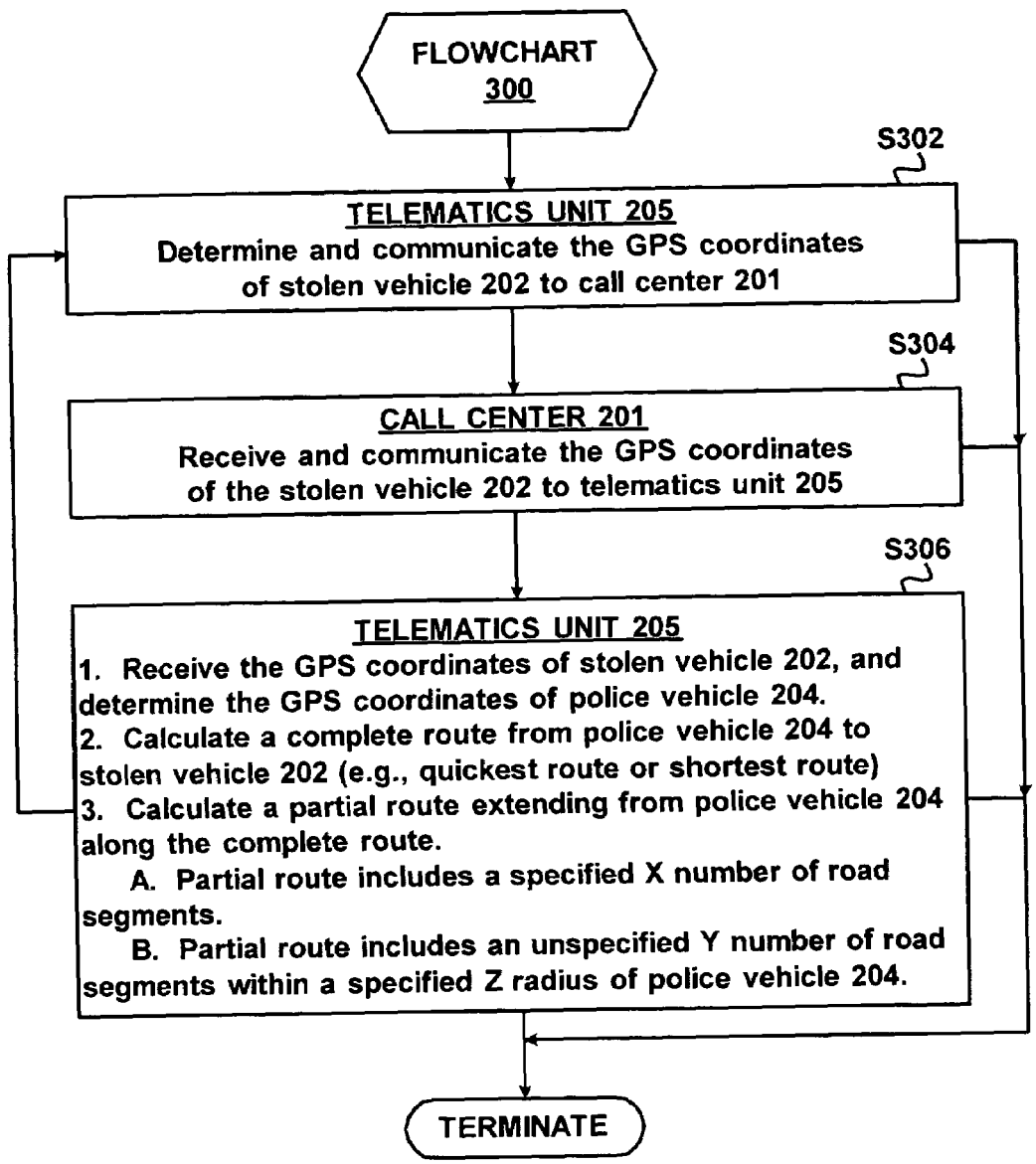
FIG. 3 illustrates a flowchart representative of a first embodiment in accordance with the present invention of a telematic method for real-time routing of a police vehicle to a stolen vehicle.
Figure 10:
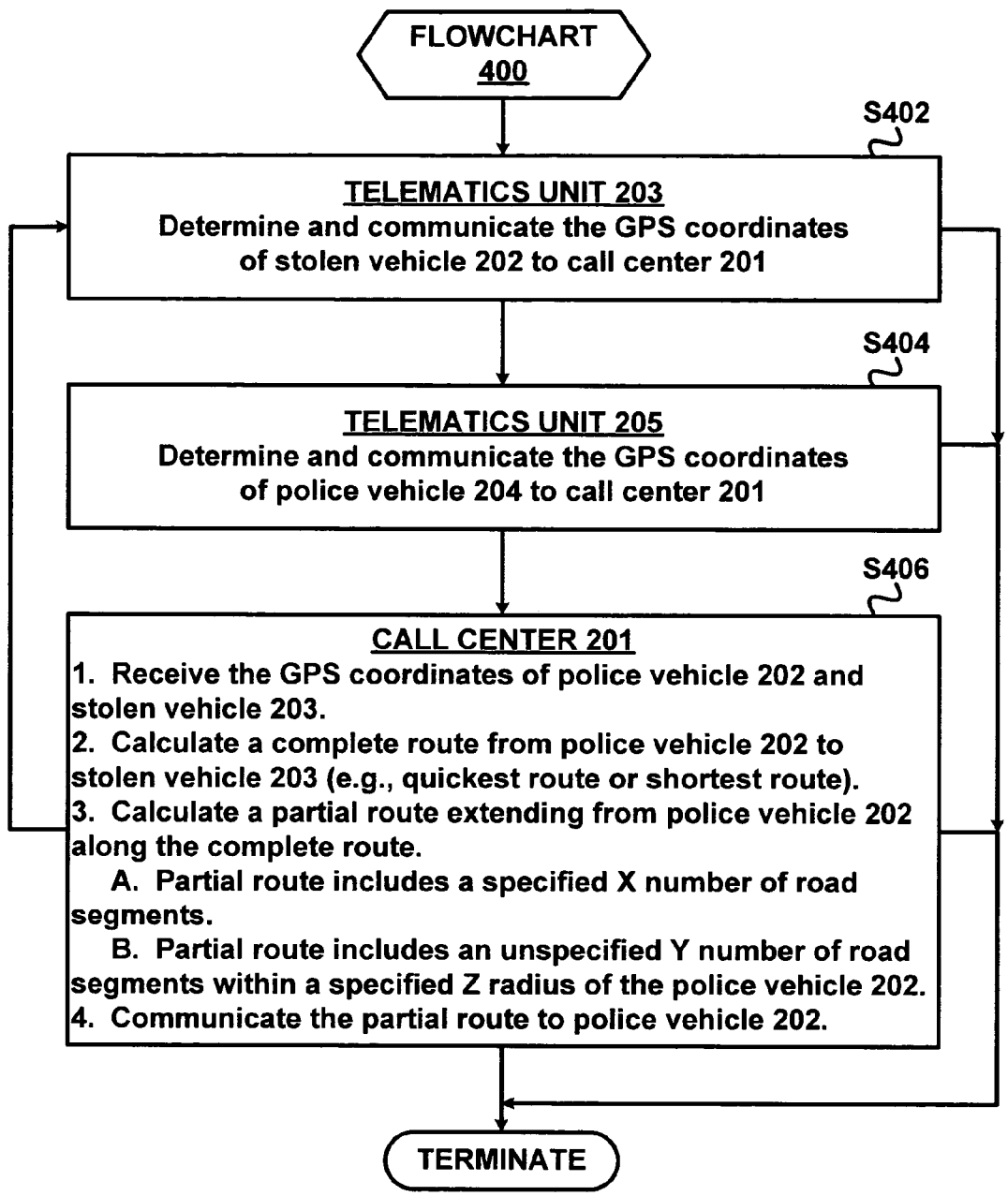
FIG. 10 illustrates a flowchart representative of a second embodiment in accordance with the present invention of a telematic method for real-time routing of a police vehicle to a stolen vehicle.

Call center 201, telematic units 203, and telematic units 205 collectively implement a telematic method for real-time routing of police vehicle 204 to stolen vehicle 202 as represented by a flowchart 300 illustrated in FIG. 3 or an alternative flowchart 400 illustrated in FIG. 10. To this end, call center 201 is, for example, call center 170 discussed with reference to FIG. 1 or any other call center configured to implement the telematic method (FIGS. 3 and 10) of the present invention, and telematics unit 203 and 204 are, for example, telematics unit 120 discussed with reference to FIG. 1, or any telematics unit configured to implement the telematic method (FIGS. 3 and 10) of the present invention. Additionally, wireless carrier system 206 is, for example, wireless carrier system 140 discussed with reference to FIG. 1, or any wireless carrier system configured to facilitate an implementation of the telematic method (FIGS. 3 and 10) of the present invention by call center 201, telematics units 203, and telematic units 205.

Referring to FIG. 3, an implementation of flowchart 300 by call center 201, telematic units 203, and telematic units 205 will now be described herein. During a stage S302 of flowchart 300, telematic unit 203 conventionally determines the GPS coordinates of stolen vehicle 202 via a conventional GPS RF link with GPS satellites 207, and communicates the GPS coordinates of stolen vehicle 202 to call center 201 via a conventional cellular RF link to wireless carrier system 206, which has a conventional link with call center 201.

During a stage S304 of flowchart 300, call center 201 communicates the GPS coordinates of the stolen vehicle 202 to telematic unit 205 via a conventional RF link from wireless carrier system 206 to telematic unit 205.

During a stage S306 of flowchart 300, telematic unit 205 conventionally determines the GPS coordinates of the police vehicle 204 via a conventional GPS RF link with GPS satellites 207. From the GPS coordinates of both the stolen vehicle 202 and the police vehicle 204, telematic unit 205 conventionally calculates a complete route from the police vehicle 204 to the stolen vehicle 202 (e.g., the shortest route or the quickest route), and conventionally calculates a partial route extending from the police vehicle 204 along the calculated complete route. In one embodiment, the partial route is a specified X number of road segments extending from police vehicle 204 along the calculated complete route. In another embodiment, the partial route is an unspecified Y number of road segments extending from police vehicle 204 within a specified Z radius of police vehicle 204 along the calculated complete route.

Stages S302–S306 are repeated as is necessary to facilitate a pursuit of stolen vehicle 202.

FIGS. 4–9 illustrate an exemplary implementation of flowchart 300 (FIG. 3) as summarized in the following TABLE 1:

TABLE 1

| ITERATION | GPS OF STOLEN VEHICLE | GPS OF POLICE VEHICLE | COMPLETE ROUTE CALCULATION | PARTIAL ROUTE CALCULATION |
|---|---|---|---|---|
| 1st (FIG. 4) | E6 | F1 | F2-F3-F4-F5-F6-E6 | F2-F3-F4 |
| 2nd (FIG. 5) | D6 | F3 | F4-F5-F6-E6-D6 | F4-F5-F6 |
| 3rd (FIG. 6) | C6 | F5 | F6-E6-D6-C6 | F6-E6-D6 |
| 4th (FIG. 7) | B6 | E6 | D6-C6-B6 | D6-C6-B6 |
| 5th (FIG. 8) | A6 | C6 | B6-A6 | B6-A6 |
| 6th (FIG. 9) | A5 | A6 | A5 | A5 |

Figure 4:
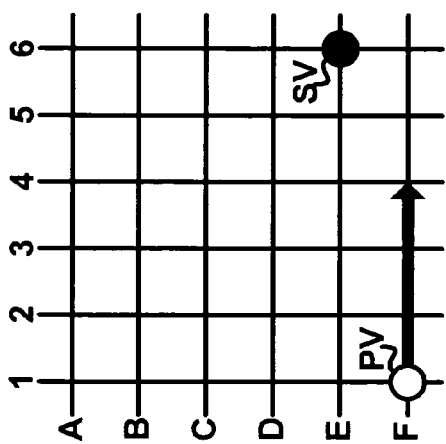
FIGS. 4–9 illustrates an exemplary implementation of the telematic method illustrated in FIG. 3 by the telematic system illustrated in FIG. 2.

A first iteration of flowchart 300 as illustrated in FIG. 4 involves (1) a determination of a first GPS coordinates E6 of stolen vehicle 202, (2) a determination of a second GPS coordinates F1 of police vehicle 204, (3) a complete route calculation of road segments defined by GPS coordinates F2-F3-F4-F5-F6-E6, and (4) a partial route calculation of three (3) specified road segments defined by GPS coordinates F2-F3-F4, where X=3.

Figure 5:
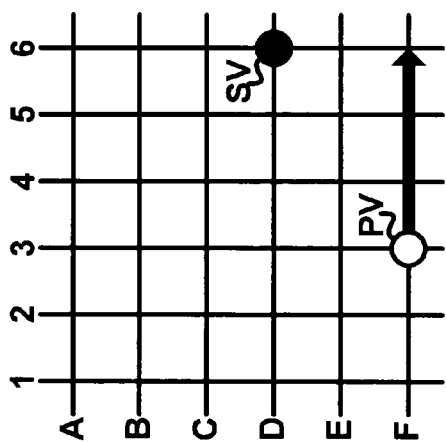

A second iteration of flowchart 300 as illustrated in FIG. 5 involves (1) a determination of a third GPS coordinates D6 of stolen vehicle 202, (2) a determination of a fourth GPS coordinates F3 of police vehicle 204, (3) a complete route calculation of road segments defined by GPS coordinates F4-F5-F-E6-D6, and (4) a partial route calculation of three (3) specified road segments defined by GPS coordinates F4-F5-F6, where X=3.

Figure 6:
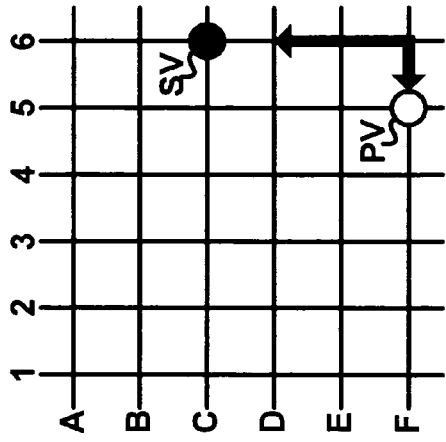

A third iteration of flowchart 300 as illustrated in FIG. 6 involves (1) a determination of a fifth GPS coordinates C6 of stolen vehicle 202, (2) a determination of a sixth GPS coordinates F5 of police vehicle 204, (3) a complete route calculation of road segments defined by GPS coordinates F6-E6-D6-C6, and (4) a partial route calculation of three (3) specified road segments defined by GPS coordinates F6-E6-D6, where X=3.

Figure 7:
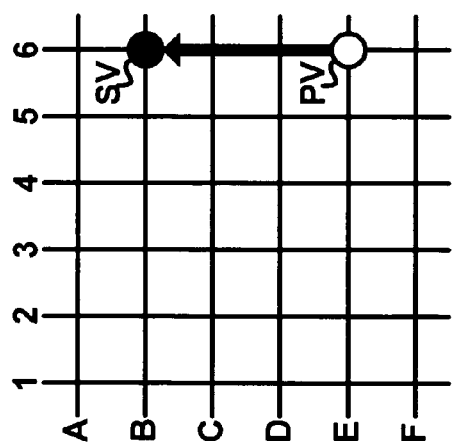

A fourth iteration of flowchart 300 as illustrated in FIG. 7 involves (1) a determination of a seventh GPS coordinates B6 of stolen vehicle 202, (2) a determination of an eighth GPS coordinates E6 of police vehicle 204, (3) a complete route calculation of road segments defined by GPS coordinates D6-C6-B6, and (4) a partial route calculation of three (3) specified road segments defined by GPS coordinates D6-C6-B6, where X=3.

Figure 8:
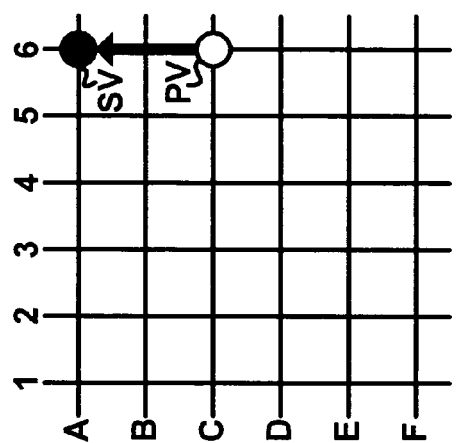

A fifth iteration of flowchart 300 as illustrated in FIG. 8 involves (1) a determination of a ninth GPS coordinates A6 of stolen vehicle 202, (2) a determination of a tenth GPS coordinates C6 of police vehicle 204, (3) a complete route calculation of road segments defined by GPS coordinates B6-A6, and (4) a partial route calculation of two (2) specified road segments defined by GPS coordinates B6-A6, where X=2.

Figure 9:
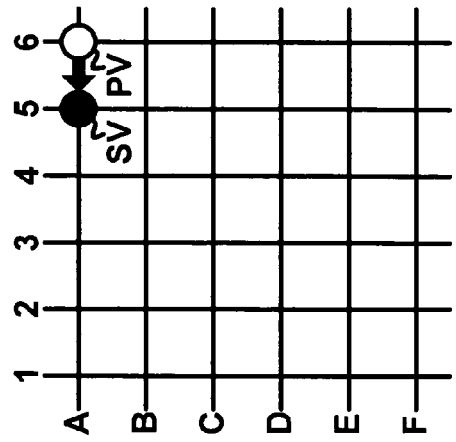

A final iteration of flowchart 300 as illustrated in FIG. 9 involves (1) a determination of an eleventh GPS coordinates A5 of stolen vehicle 202, (2) a determination of a twelfth GPS coordinates A6 of police vehicle 204, (3) a complete route calculation of road segments defined by GPS coordinates A5, and (4) a partial route calculation of one (1) specified road segments defined by GPS coordinates A5, where X=1.

Referring to FIG. 10, an implementation of flowchart 400 by call center 201, telematic units 203, and telematic units 205 will now be described herein. During a stage S402 of flowchart 400, telematic unit 203 conventionally determines the GPS coordinates of stolen vehicle 202 via a conventional GPS RF link with GPS satellites 207, and communicates the GPS coordinates of stolen vehicle 202 to call center 201 via a conventional cellular RF link to wireless carrier system 206, which has a conventional link with call center 201.

During a stage S404 of flowchart 400, telematic unit 205 conventionally determines the GPS coordinates of police vehicle 204 via a conventional GPS RF link with GPS satellites 207, and communicates the GPS coordinates of police vehicle 204 to call center 201 via a conventional cellular RF link to wireless carrier system 206.

During a stage S406 of flowchart 400, from the GPS coordinates of both the stolen vehicle 202 and the police vehicle 204, call center 201 conventionally calculates a complete route from the police vehicle 204 to the stolen vehicle 202 (e.g., the shortest route or the quickest route), conventionally calculates a partial route extending from the police vehicle 204 along the calculated complete route, and conventionally communicates the partial route calculation to telematic unit 205. In one embodiment, the partial route is a specified X number of road segments extending from police vehicle 204 along the calculated complete route. In another embodiment, the partial route is an unspecified Y number of road segments extending from police vehicle 204 within a specified Z radius of police vehicle 204 along the calculated complete route.

Stages S402–S406 are repeated as is necessary to facilitate a pursuit of stolen vehicle 202.

As used herein, the term "police vehicle" has a broad definition, and includes vehicles operated by public safety officials such as police and fire fighters. However, the term "police vehicle" is not limited to police and fire services, and includes any vehicle attempting to locate another vehicle. As used herein, the term "stolen vehicle" has a broad definition, and includes vehicles which are being driven without the authority or permission of the owner, and further includes vehicles being driven with the authority of the owner, but whose current location is desired by another vehicle. For example, the "stolen vehicle" is the lead vehicle in a funeral procession, and all vehicles following the lead vehicle are "police vehicles." In another example, the "stolen vehicle" is leading the "police vehicles" to the destination desired by the "stolen vehicle."

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. In a system including a first telematic unit incorporated within a stolen vehicle, a call center, and a second telematic unit incorporated with a police vehicle, a method for real-time routing to the stolen vehicle, the method comprising:
   operating the first telematic unit to determine a first GPS coordinates of the stolen vehicle, and to communicate the first GPS coordinates of the stolen vehicle to the call center;
   operating the call center to communicate the first GPS coordinates of the stolen vehicle to the second telematic unit;
   operating the second telematic unit to determine a second GPS coordinates of the police vehicle;
   operating the second telematic unit to calculate a first complete route from the second GPS coordinates to the first GPS coordinates;
   operating the second telematic unit to calculate a first partial route extending from the second GPS coordinates along the first complete route;
   operating the first telematic unit to determine a third GPS coordinates of the stolen vehicle, and to communicate the third GPS coordinates of the stolen vehicle to the call center prior to the police vehicle traversing the first partial route;
   operating the call center to communicate the third GPS coordinates of the stolen vehicle to the second telematic unit prior to the police vehicle traversing the first partial route;
   operating the second telematic unit to determine a fourth GPS coordinates of the police vehicle prior to the police vehicle traversing the first partial route;
   operating the second telematic unit to calculate a second complete route from the fourth GPS coordinates to the third GPS coordinates prior to the police vehicle traversing the first partial route; and
   operating the second telematic unit to calculate a second partial route extending from the fourth GPS coordinates along the second complete route.

2. The method of claim 1, wherein the first partial route includes a specified number X of road segments extending from the first GPS coordinates along the first complete route.

3. The method of claim 1, wherein the first partial route includes an unspecified number Y of road segments extending, within a specified radius Z from the first GPS coordinates along the first complete route.

4. In a system including a first telematic unit incorporated within a stolen vehicle, a call center, and a second telematic unit incorporated with a police vehicle, a method for real-time routing to the stolen vehicle, the method comprising:
   operating the first telematic unit to determine a first GPS coordinates of the stolen vehicle, and to communicate the first GPS coordinates of the stolen vehicle to the call center;
   operating the second telematic unit to determine a second GPS coordinates of the police vehicle, and to communicate the second GPS coordinates of the police vehicle to the call center;
   operating the call center to calculate a first complete route from the second GPS coordinates to the first GPS coordinates;
   operating the call center to calculate a first partial route extending from the second GPS coordinates along the first complete route;
   operating the call center to communicate the first partial route to the second telematic unit;
   operating the first telematic unit to determine a third GPS coordinates of the stolen vehicle, and to communicate the third GPS coordinates of the stolen vehicle to the call center prior to the police vehicle traversing the first partial route;
   operating the second telematic unit to determine a fourth GPS coordinates of the police vehicle, and to communicate the fourth GPS coordinates of the police vehicle to the call center prior to the police vehicle traversing the first partial route;
   operating the call center to calculate a second complete route from the fourth GPS coordinates to the third GPS coordinates prior to the police vehicle traversing the first partial route;
   operating the call center to calculate a second partial route extending from the fourth GPS coordinates along the second complete route; and
   operating the call center to communicate the second partial route to the second telematic unit.

5. The method of claim 4, wherein the first partial route includes a specified number X of road segments extending from the second GPS coordinates along the first complete route.

6. The method of claim 4, wherein the first partial route includes an unspecified number Y of road segments extending within a specified radius Z from the second GPS coordinates along the first complete route.

7. A telematic unit for real-time routing of a police vehicle to a stolen vehicle, said telematic unit comprising:
   means for receiving a first GPS coordinates of the stolen vehicle;
   means for determining a second GPS coordinates of the police vehicle;
   means for calculating a first complete route from the second GPS coordinates to the first GPS coordinates;
   means for calculating a first partial route extending from the second GPS coordinates along the first complete route;
   means for receiving a third GPS coordinates of the stolen vehicle prior to the police vehicle traversing the first partial route;
   means for determining a fourth GPS coordinates of the police vehicle prior to the police vehicle traversing the first partial route;
   means for calculating a second complete route from the fourth GPS coordinates to the third GPS coordinates prior to the police vehicle traversing the first partial route; and means for calculating a second partial route extending from the fourth GPS coordinates along the second complete route.

8. The telematic unit of claim 7, wherein the first partial route includes a specified number X of road segments extending from the first GPS coordinates along the first complete route.

9. The telematic unit of claim 7, wherein the first partial route includes an unspecified number Y of road segments extending within a specified radius Z from the first GPS coordinates along the first complete route.

10. A system for real-time routing of a police vehicle to a stolen vehicle, said system comprising:
   means for receiving a first GPS coordinates of the stolen vehicle;
   means for receiving a second GPS coordinates of the police vehicle;
   means for calculating a first complete route from the second GPS coordinates to the first GPS coordinates;
   means for calculating a first partial route extending from the second GPS coordinates along the first complete route;
   means for receiving a third GPS coordinates of the stolen vehicle prior to the police vehicle traversing the first partial route;
   means for receiving a fourth GPS coordinates of the police vehicle prior to the police vehicle traversing the first partial route;
   means for calculating a second complete route from the fourth GPS coordinates to the third GPS coordinates prior to the police vehicle traversing the first partial route; and
   means for calculating a second partial route extending from the fourth GPS coordinates along the second complete route.

11. The system of claim 10, wherein the first partial route includes a specified number X of road segments extending from the first GPS coordinates along the first complete route.

12. The system of claim 10, wherein the first partial route includes an unspecified number Y of road segments extending within a specified radius Z from the first GPS coordinates along the first complete route.

* * * * *